(12) United States Patent
Qi et al.

(10) Patent No.: US 9,896,742 B2
(45) Date of Patent: Feb. 20, 2018

(54) METHOD FOR PROCESSING VANADIUM-TITANIUM MAGNETITE FINISHED ORES BY USING WET PROCESS

(71) Applicant: INSTITUTE OF PROCESS ENGINEERING, CHINESE ACADEMY OF SCIENCES, Beijing (CN)

(72) Inventors: Tao Qi, Beijing (CN); Lina Wang, Beijing (CN); Desheng Chen, Beijing (CN); Hongxin Zhao, Beijing (CN); Yahui Liu, Beijing (CN); Tianyan Xue, Beijing (CN); Jingkui Qu, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 307 days.

(21) Appl. No.: 14/783,848

(22) PCT Filed: Apr. 10, 2014

(86) PCT No.: PCT/CN2014/075030
§ 371 (c)(1),
(2) Date: Oct. 10, 2015

(87) PCT Pub. No.: WO2014/183511
PCT Pub. Date: Nov. 20, 2014

(65) Prior Publication Data
US 2016/0060728 A1    Mar. 3, 2016

(30) Foreign Application Priority Data

May 17, 2013  (CN) .......................... 2013 1 0183647
May 17, 2013  (CN) .......................... 2013 1 0184750

(51) Int. Cl.
  C01G 31/02         (2006.01)
  C22B 3/10          (2006.01)
  (Continued)

(52) U.S. Cl.
  CPC ........... C22B 34/1245 (2013.01); B01J 6/001 (2013.01); C01G 23/053 (2013.01);
  (Continued)

(58) Field of Classification Search
  CPC .. C01G 31/02; C01G 23/053; C01G 23/0536; C22B 3/10; C22B 3/44; C22B 3/0005;
  (Continued)

(56) References Cited

U.S. PATENT DOCUMENTS 3,764,651 A * 10/1973 Henkel ............... C22B 34/1204
                                                 423/86
3,903,239 A    9/1975 Berkovich
(Continued)

FOREIGN PATENT DOCUMENTS

CN    101289703 A    10/2008
CN    101538649 A     9/2009
(Continued)

OTHER PUBLICATIONS

Qu Jingkui et al. CN-103276211-A machine translation (Year: 2013).*
(Continued)

Primary Examiner — George Wyszomierski
Assistant Examiner — Tima M McGurthry Banks
(74) Attorney, Agent, or Firm — Gokalp Bayramoglu

(57) ABSTRACT

A method for processing vanadium-titanium magnetite finished ores by using a wet process. The method comprises the steps: extracting vanadium from vanadium-titanium magnetite finished ores and processing, by using the vanadium extraction method, obtained leaching residue by using a wet
(Continued)

process, so as to obtain titanium; and calcining the remaining liquid extracted during the vanadium extraction, so as to prepare ferric oxide. The flow of the method is short, and the energy consumption is low, thereby avoiding waste of a titanium resource.

55 Claims, 3 Drawing Sheets

(51) Int. Cl.
*C01G 23/053* (2006.01)
*C22B 3/44* (2006.01)
*C22B 3/00* (2006.01)
*C22B 34/22* (2006.01)
*C22B 34/12* (2006.01)
*C22B 1/02* (2006.01)
*C22B 3/26* (2006.01)
*B01J 6/00* (2006.01)
*C22B 1/00* (2006.01)
*C22B 5/12* (2006.01)
*C22B 9/02* (2006.01)

(52) U.S. Cl.
CPC .......... *C01G 23/0536* (2013.01); *C01G 31/02* (2013.01); *C22B 1/00* (2013.01); *C22B 1/02* (2013.01); *C22B 3/0005* (2013.01); *C22B 3/10* (2013.01); *C22B 3/44* (2013.01); *C22B 5/12* (2013.01); *C22B 9/023* (2013.01); *C22B 34/1209* (2013.01); *C22B 34/1259* (2013.01); *C22B 34/22* (2013.01); *Y02P 10/234* (2015.11)

(58) Field of Classification Search
CPC ............ C22B 34/1209; C22B 34/1245; C22B 34/1259; C22B 34/22
See application file for complete search history.

(56) References Cited

U.S. PATENT DOCUMENTS 4,150,092 A * 4/1979 Pitts ..................... C01G 31/003
423/144
6,803,024 B1 * 10/2004 Van Dyk ............. C01G 23/047
423/69

FOREIGN PATENT DOCUMENTS

| CN | 101967563 A | * | 2/2011 |
| CN | 102260786 A | * | 11/2011 |
| CN | 102534234 A | | 7/2012 |
| CN | 1032025899 A | | 4/2013 |
| CN | 103276196 A | | 9/2013 |
| CN | 103276204 A | | 9/2013 |
| CN | 103276211 A | * | 9/2013 |
| WO | WO-2013104033 A | * | 7/2013 |

OTHER PUBLICATIONS

Peng. CN-102260786-A machine translation (Year: 2011).*
Jicheng He et al. CN-101967563-A machine translation (Year: 2011).*
De Farias J et al. WO-2013104033-A machine translation (Year: 2013).*

* cited by examiner

METHOD FOR PROCESSING VANADIUM-TITANIUM MAGNETITE FINISHED ORES BY USING WET PROCESS

TECHNICAL FIELD

The invention belongs to the field of hydrometallurgy, and particularly relates to a method for processing vanadium-titanium magnetite finished ores by using a wet process.

BACKGROUND

Vanadium-titanium magnetite is a composite ore with iron, vanadium, titanium and multiple valuable elements coexisting, is a major source of vanadium and titanium products in China and is mainly distributed in Panxi and Chengde areas of China with abundant reserves. At present, a traditional process flow for processing of the vanadium-titanium magnetite is as follows; the vanadium-titanium magnetite is subjected to mineral processing and separation to obtain iron finished ores and titanium finished ores, and then iron, vanadium and titanium are extracted by processing the iron finished ores and the titanium finished ores respectively, thus giving rise to long subsequent processing flow, low resource utilization rate and high cost. The iron finished ores are processed by adopting a 'blast furnace-converter' flow to produce iron and vanadium residue, and titanium in the iron finished ores is, however, wasted basically; and the titanium finished ores are mainly used for producing titanium dioxide, titanium sponge and the like, and iron in the titanium finished ores is, however, discharged in a form of ferrous sulfate solid wastes. Thus, the comprehensive utilization rate of vanadium resources is only 47%, the recovery rate of titanium resources is less than 15%, and therefore, resources are wasted seriously; and multiple roasting at high temperature is required in the subsequent process of extracting vanadium from vanadium residue to produce high energy consumption, and the problems, such as serious pollution from three wastes, low vanadium conversion rate and low product quality are caused. At present, the resource utilization rate of vanadium-titanium magnetite is far lower than the goal, in which the comprehensive utilization rate of vanadium resources is over 50%, the recovery rate of titanium resources reaches over 20%, and major coexisting rare metals, such as chromium, cobalt and nickel can realize large-scale recycling in the vanadium-titanium magnetite, of 'the Twelfth Five-year Plan of Comprehensive Utilization and Industrial Development of Vanadium-Titanium Resources' of China. In recent years, with the economic development of China and ever-increasing demand on products of vanadium, titanium and the like, the improvement of the technical level of the comprehensive utilization of vanadium and titanium in iron finished ores and titanium finished ores resources has a very important meaning in the sustainable development of the economy of China.

The hydrometallurgy has the advantages of high comprehensive recovery degree of valuable metals, relatively easy realization of continuity and automation of the production process, and the like, wherein acid leaching is the most commonly used leaching method in the hydrometallurgy. HCL has the advantage of high reaction capacity and has the capability of leaching oxysalts that cannot be leached by some sulfuric acids, and there have been relevant studies made in terms of processing titanium-containing minerals with the HCL, therefore, the HCL can be used for selectively leaching impurities in titanium finished ores and titanium residue to prepare artificial rutile. However, there has been no patent or report of using the HCL to directly process vanadium-titanium magnetite finished ores, and a solution obtained after leaching of finished ores by using HCL is complicated in component, large in quantity of impurity ions and difficult to separate. As an effective means for metal enrichment as well as purification and separation, the solvent extraction technique has the advantages of high recovery rate, simple process equipment, continuous operation and the like and is highly regarded in the industry. At present, as for the studies of extracting vanadium from an acidic vanadium-containing leaching solution, vanadium extraction from a sulfuric acid system is studied much more, and it is relatively difficult to extract vanadium from an HCL system with high acidity and high iron content.

Most vanadium in an HCL leaching solution of vanadium-titanium magnetite finished ores exists in a form of vanadyl ions ($VO2^+$) and is capable of being extracted by using an acidic cationic extracting agent P204 or P507. However, since P204 or P507 has relatively high extracting capacity to Fe(III), Fe (III) becomes an important impurity element in the vanadium extraction process, and therefore, the leaching solution must be preprocessed before being extracted. Since the P204 or P507 has the capability of extracting Fe(III) rather than Fe(II), Fe(II) in the leaching solution needs to be reduced into Fe(I) to ensure that Fe in an aqueous phase exists basically in a form of Fe(II) and fails to be extracted by P204 or P507, and thus a purifying purpose is achieved. At present, all the enterprises where vanadium is extracted from an acidic leaching solution employ a Fe powder or sodium sulfite reduction method which can consume a large amount of reducing agent to cause great waste, and especially when iron chippings are used as a reducing agent, the iron content in a stock solution will be greatly increased to bring inconvenience to the subsequent procedures and greatly influence the vanadium extraction rate. At present, there has been no report that Fe(III) is reduced into Fe(II) by carrying out pre-reduction processing on vanadium-titanium magnetite finished ores so as to reduce the Fe(III) content in the leaching solution.

Generally, titanium residue is produced by taking titanium finished ores as a raw material through a high-temperature electric furnace smelting process. Owing to electric furnace smelting, the produced titanium residue has a relatively stable phase, and since concentrated sulfuric acid having the mass fraction of 92% is usually adopted for acidifying the titanium residue and acid liquor is difficult to recycle, a large amount of waste acid is discharged. At present, there has been no patent or report of preparing titanium residue from vanadium-titanium magnetite finished ores or bulk finished ores (a mixture of iron finished ores and titanium finished ores) by using a hydrometallurgical process.

SUMMARY OF THE INVENTION

The invention aims at providing a novel method for processing vanadium-titanium magnetite finished ores, namely a novel method for separating and extracting silver, titanium and iron from vanadium-titanium magnetite finished ores. In the novel process, the vanadium-titanium magnetite finished ores are pre-reduced so as to reduce Fe(III) in the finished ores into Fe(II), so that the finished ores are activated, the leaching rate of vanadium and iron in an HCL leaching process is increased, and meanwhile, the content of Fe(II) in the leaching solution is greatly reduced, the addition amount of a reducing agent to the leaching solution is reduced, no new impurity is introduced in the reduction process and no vanadium loss is caused; leaching residue is mainly an enriched product of titanium and silicon, the content of other impurities is very low, and the titanium residue is prepared after further alkaline washing and desilicification to provide an effective raw material guarantee for subsequent preparation of titanium dioxide. The whole process is simple, short in flow, good in reduction effect, high in vanadium extraction rate and titanium recovery rate and low in cost.

The solution to be adopted for solving the technical problem of the invention lies in that: pre-reducing vanadium-titanium magnetite finished ores so as to reduce Fe(II) in the finished ores into Fe(II), then leaching reduzate by using HCL, filtering to obtain a vanadium-containing leaching solution and leaching residue, adding a little amount of reducing agent according to the content of Fe(III) in the leaching solution and a desired proportion for finishing reaction to ensure that all Fe(II) in the leaching solution is reduced into Fe(I), adjusting the pH value of the reducing solution by using an alkaline substance, and finally extracting vanadium from the vanadium-containing leaching solution by using an extracting agent to obtain a pure vanadium solution; preparing ammonium metavanadate or vanadium pentoxide from the pure vanadium solution according to a conventional method; preparing titanium residue from leaching residue through the steps of water washing, alkaline neutralizing, alkaline washing and desilicification, acid washing and drying; and calcining raffinate to prepare ferric oxide.

The method for preparing titanium residue by processing vanadium-titanium magnetite finished ores by using a wet process comprises the following steps:

(1) mixing the vanadium-titanium magnetite finished ores with a HCL solution, and leaching for 1 to 10 h at 100-150° C. to obtain intermediate slurry;

(2) filtering the intermediate slurry obtained in the step 1) to obtain leaching residue, and carrying out two-stage water washing on the leaching residue, wherein the water washing time ranges from 5 min to 60 min and the water washing temperature ranges from 25° C. to 80° C. in each stage of water washing;

(3) neutralizing water washing residue obtained in the step 2) with a diluted alkaline solution for 5 to 60 min at 25-80° C., adjusting the pH value of slurry to 5-6, and filtering the neutralized slurry to obtain neutralization residue;

(4) mixing the neutralization residue obtained in the step 3) with a NaOH solution, and carrying out alkaline washing and desilicification reaction at 50-110° C. for 5 min to 60 min:

(5) filtering a product obtained after the alkaline washing and desilicification reaction in the step 4) to obtain alkaline washing residue and carrying out water washing on the alkaline washing residue; and (6) washing the water washing residue obtained after water washing in the step 5) with diluted sulfuric acid and adjusting the pH value to 5-6, filtering after acid washing, and drying filter residue to obtain the titanium residue.

According to the method for preparing titanium residue of the invention, the liquid-solid mass ratio of the finished ores to the HCL solution in the step 1) is 1:1 to 10:1.

According to the method for preparing titanium residue of the invention, the percentage concentration by mass of the HCL solution in the step 1) is 10% to 36%.

According to the method for preparing titanium residue of the invention, a liquid-solid ratio of washing water to leaching residue in each stage of water washing process in the step 2) is 2:1 to 10:1.

According to the method for preparing titanium residue of the invention, the water washing slurry in the step 2) is filtered to obtain first washing water and second washing water respectively, wherein the first washing water is used for a leaching process of the step 1), and the second washing water is used for an acid washing process of the step 4).

According to the method for preparing titanium residue of the invention, a liquid-solid ratio of the diluted alkaline solution to the water washing residue in the step 3) is 2:1 to 10:1.

According to the method for preparing titanium residue of the invention, the concentration of the diluted alkaline solution in the step 3) is 5%-20%.

According to the method for preparing titanium residue of the invention, the diluted alkaline solution in the step 3) is a NaOH solution.

According to the method for preparing titanium residue of the invention, a liquid-solid ratio of the NaOH solution to the neutralization residue in the step 4) is 2:1 to 10:1.

According to the method for preparing titanium residue of the invention, the percentage concentration by mass of the NaOH solution in the step 4) is 9%-25%.

According to the method for preparing titanium residue of the invention, a liquid-solid ratio of the washing water to the alkaline washing residue in the step 5) is 2:1 to 10:1.

According to the method for preparing titanium residue of the invention, a liquid-solid ratio of the diluted sulfuric acid to the water washing residue in the step 6) is 2:1 to 10:1.

According to the method for preparing titanium residue of the invention, the concentration of the diluted sulfuric acid in the step 6) is 5%-20%.

According to the method for preparing titanium residue of the invention, washing liquor obtained after water washing and filtering in the step 6) is used for a neutralization process of water washing residue in the step 3).

A method for extracting vanadium from vanadium-titanium magnetite finished ores according to the invention comprises the following steps:

1) pre-reducing the vanadium-titanium magnetite finished ores at the reaction temperature of 600-100° C. so as to reduce Fe(II) in the finished ores into Fe(II) to obtain reduzate;

2) mixing the reduzate obtained in the step 1) with HCL, and leaching for 1-10 h at 100-150° C. to obtain intermediate slurry;

3) filtering the intermediate slurry obtained in the step 2) to obtain a vanadium-containing leaching solution and leaching residue;

4) heating the vanadium-containing leaching solution obtained in the step 3) to 30-90° C., stirring, adding a reducing agent to reduce Fe(III) in the leaching solution into Fe(II) to obtain a reducing solution;

5) adjusting the pH value of the reducing solution obtained in the step 4) with an alkaline substance to −0.5 to 2, and filtering:

6) mixing the filtered solution obtained in the step 5) with an extracting agent, and extracting to obtain a vanadium-bearing organic phase and raffinate;

7) carrying out back extraction on the vanadium-bearing organic phase obtained in the step 6) by using an acidic solution to obtain a vanadium-containing solution; and 8) preparing ammonium vanadate or vanadium pentoxide from the vanadium-containing solution.

According to the method for extracting vanadium from vanadium-titanium magnetite finished ores of the invention, the reducing agent used in pre-reduction in the step 1) is gas or hydrogen.

According to the method for extracting vanadium from vanadium-titanium magnetite finished ores of the invention, the mass ratio of the reduzate to the HCL in the step 2) is 1:1 to 1:10;

According to the method for extracting vanadium from vanadium-titanium magnetite concentration of the invention, the percentage concentration by mass of the HCL in the step 2) is 10-36%.

According to the method for extracting vanadium from vanadium-titanium magnetite finished ores of the invention, the reducing agent in the step 4) is Fe powder or sodium sulfite.

According to the method for extracting vanadium from vanadium-titanium magnetite finished ores of the invention, the alkaline substance in the step 5) is one of NaOH, aqueous ammonia, $CaCO_3$ or $Ca(OH)_2$.

According to the method for extracting vanadium from vanadium-titanium magnetite finished ores of the invention, the proportion of the organic phase to an aqueous phase in the extraction process of the step 6) is 1:1 to 1:6.

According to the method for extracting vanadium from vanadium-titanium magnetite finished ores of the invention, the extracting agent in the step 6) is a P204 and TBP kerosene mixed solvent, or a P507 and TBP kerosene mixed solvent.

According to the method for extracting vanadium from vanadium-titanium magnetite finished ores of the invention, the proportion of the vanadium-bearing organic phase to an aqueous phase in the back extraction process of the step 7) is 1:1 to 6:1.

According to the method for extracting vanadium from vanadium-titanium magnetite finished ores of the invention, the acidic solution in the step 7) is 1-4.5 mol/L diluted sulfuric acid or 1-8 mol/L diluted HCL.

According to the method for extracting vanadium from vanadium-titanium magnetite finished ores of the invention, the preparation method in the step 8) is a precipitation method.

According to the method for extracting vanadium from vanadium-titanium magnetite finished ores of the invention, the leaching residue obtained by filtering in the step 3) is subjected to wet processing, wherein the wet processing is the same as the processing to leaching residue in the process of preparing the titanium residue by processing vanadium-titanium magnetite finished ores by using a wet process, specifically comprising the following steps:

3-1) carrying out two-stage water washing on the leaching residue, wherein the water washing time ranges from 5 min to 60 min and the water washing temperature ranges from 25° C. to 80° C. in each stage of water washing;

3-2) neutralizing the water washing residue obtained in the step 3-1) with a diluted alkaline solution for 5-60 min at 25-80° C., adjusting the pH value of slurry to 5-6, and filtering the neutralized slurry to obtain neutralization residue;

3-3) mixing the neutralization residue obtained in the step 3-2) with a NaOH solution, and carrying out alkaline washing and desilicification reaction at 50-110° C. for 5-60 min;

3-4) filtering the product obtained after alkaline washing and desilicification reaction in the step 3-3) to obtain alkaline washing residue and carrying out water washing; and 3-5) washing the water washing residue obtained after water washing in the step 3-4) with diluted sulfuric acid and adjusting the pH value to 5-6, filtering after acid washing, and drying filter residue to obtain titanium residue.

According to the method for extracting vanadium from vanadium-titanium magnetite finished ores of the invention, a liquid-solid ratio of washing water to leaching residue in each stage of water washing process in the step 3-1) is 2:1 to 10:1.

According to the method for extracting vanadium from vanadium-titanium magnetite finished ores of the invention, the water washing slurry in the step 3-1) is filtered to obtain first washing water and second washing water respectively, wherein the first washing water is used for a leaching process in the step 2), and the second washing water is used for an acid washing process in the step 3-5).

According to the method for extracting vanadium from vanadium-titanium magnetite finished ores of the invention, a liquid-solid ratio of the diluted alkaline solution to the water washing residue in the step 3-2) is 2:1 to 10:1.

According to the method for extracting vanadium from vanadium-titanium magnetite finished ores of the invention, the concentration of the diluted alkaline solution in the step 3-2) is 5% to 20%.

According to the method for extracting vanadium from vanadium-titanium magnetite finished ores of the invention, the diluted alkaline solution in the step 3-2) is a NaOH solution.

According to the method for extracting vanadium from vanadium-titanium magnetite finished ores of the invention, a liquid-solid ratio of the NaOH solution to the neutralization residue in the step 3-3) is 2:1 to 10:1.

According to the method for extracting vanadium from vanadium-titanium magnetite finished ores of the invention, the percentage concentration by mass of the NaOH solution in the step 3-3) is 9%-25%.

According to the method for extracting vanadium from vanadium-titanium magnetite finished ores of the invention, a liquid-solid ratio of the washing water to the alkaline washing residue in the step 3-4) is 2:1 to 10:1.

According to the method for extracting vanadium from vanadium-titanium magnetite finished ores of the invention, a liquid-solid ratio of the diluted sulfuric acid to water washing residue in the step 3-5) is 2:1 to 10:1.

According to the method for extracting vanadium from vanadium-titanium magnetite finished ores of the invention, the concentration of the diluted sulfuric acid in the step 3-5) is 5% to 20%.

According to the method for extracting vanadium from vanadium-titanium magnetite finished ores of the invention, the washing liquor obtained after water washing and filtering in the step 3-5) is used for a neutralization process of the water washing residue in the step 3-2).

According to the method for extracting vanadium from vanadium-titanium magnetite finished ores of the invention, the raffinate in the step 6) can be calcined to prepare ferric oxide.

The invention proposes the solution of leaching pre-reduced vanadium-titanium magnetite finished ores with HCL and then extracting vanadium by using an extraction method, wherein Fe(III) in the finished ores are reduced into Fe(I) by means of pre-reduction while the finished ores are activated, the leaching rate of vanadium and iron is increased and the content of Fe(II) in a HCL leaching solution is greatly reduced, and thus the addition amount of the reducing agent to the leaching solution in the subsequent step is greatly reduced and the process cost is lowered; the method for extracting vanadium under high acidity is high in recovery rate and simple and convenient to operate; and leaching residue is mainly an enriched product of titanium and silicon, the content of other impurities is very low, and the titanium residue is prepared after further alkaline washing and desilicification, so that the process is simple and convenient and the titanium recovery rate is high. According to the invention, the titanium residue is prepared by directly using vanadium-titanium magnetite finished ores to substitute for titanium finished ores according to a hydrometallurgical method that is mild in conditions, so that the problem that titanium in vanadium-titanium magnetite finished ores in a traditional blast furnace process fails to be utilized after entering blast furnace residue is solved, the cost of raw materials is greatly reduced, the titanium in vanadium-titanium magnetite finished ores is sufficiently utilized, the utilization rate of titanium resources approaches to 100%, and the produced titanium residue can be further used for preparing high-quality raw materials of titanium dioxide.

The invention has the advantages that:

(1) the method proposed by the invention for separating and extracting vanadium by processing vanadium-titanium magnetite finished ores by using a wet process is relatively low in cost of raw materials and solves the problems in a traditional process of extracting vanadium from vanadium residue, such as high energy consumption caused in need of multiple roasting at high temperature, serious pollution from three wastes, low vanadium conversion ratio and low product quality.

(2) The invention proposes the solution of pre-reducing vanadium-titanium magnetite finished ores so as to reduce Fe(III) in the finished ores into Fe(II), so that the finished ores are activated, the leaching rate of vanadium and iron is increased, the content of Fe(III) in a leaching solution is greatly reduced, and the addition amount of the reducing agent in the leaching solution is greatly reduced.

(3) The method proposed by the invention for preparing titanium residue by processing vanadium-titanium magnetite finished ores by using a wet process has the advantages of short flow, mild operation conditions, low equipment investment and the like.

(4) According to the invention, titanium in iron finished ores is sufficiently utilized, the utilization rate of titanium resources is high, the recovery rate of titanium in finished ores is nearly 100%, and the produced titanium residue can be used as a raw material for producing titanium dioxide.

DETAIL DESCRIPTION OF THE INVENTION

Embodiment 1

Figure 1:
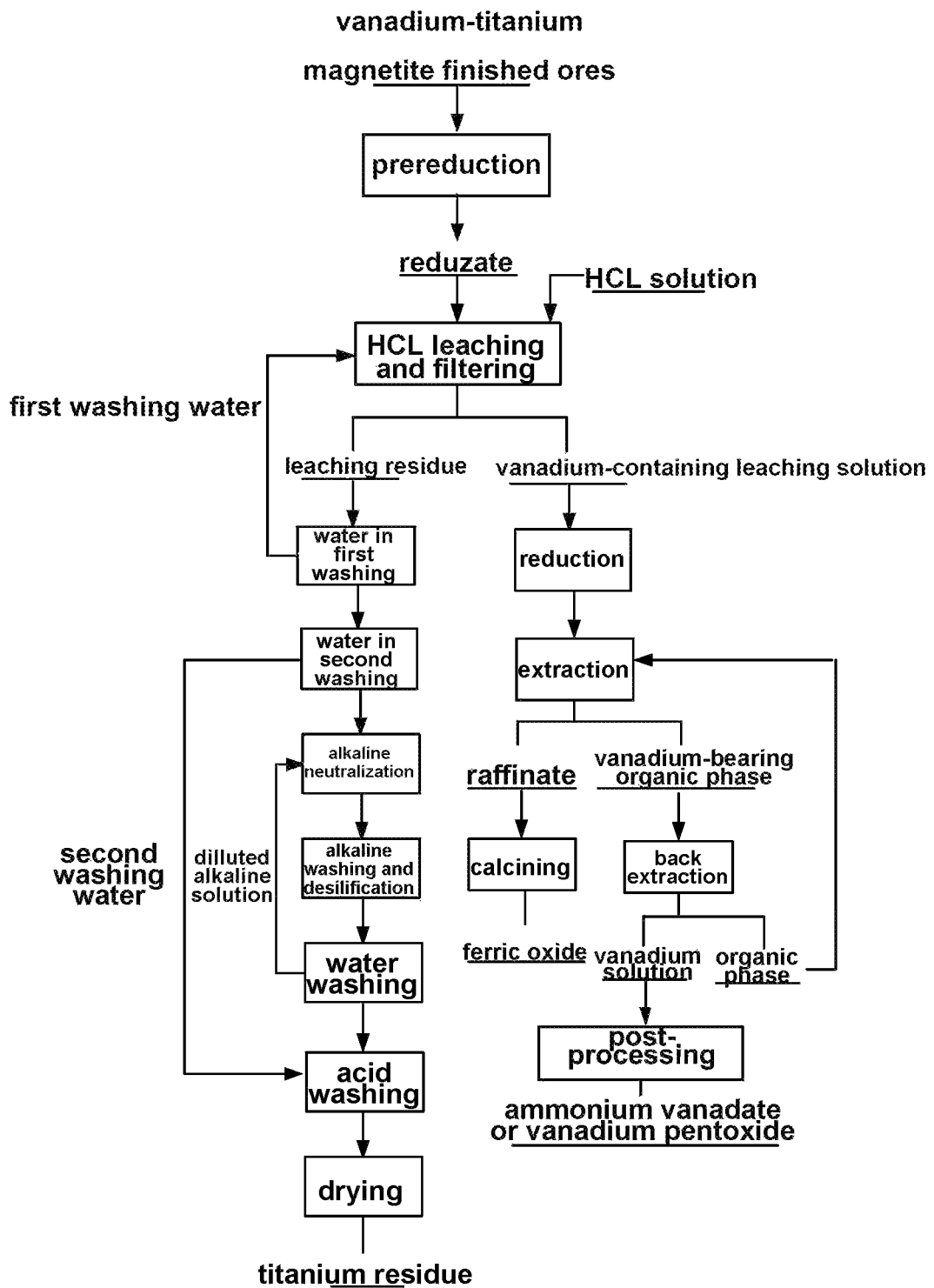
FIG. 1 is a process flow diagram of embodiment 1 of the invention.
Figure 2:
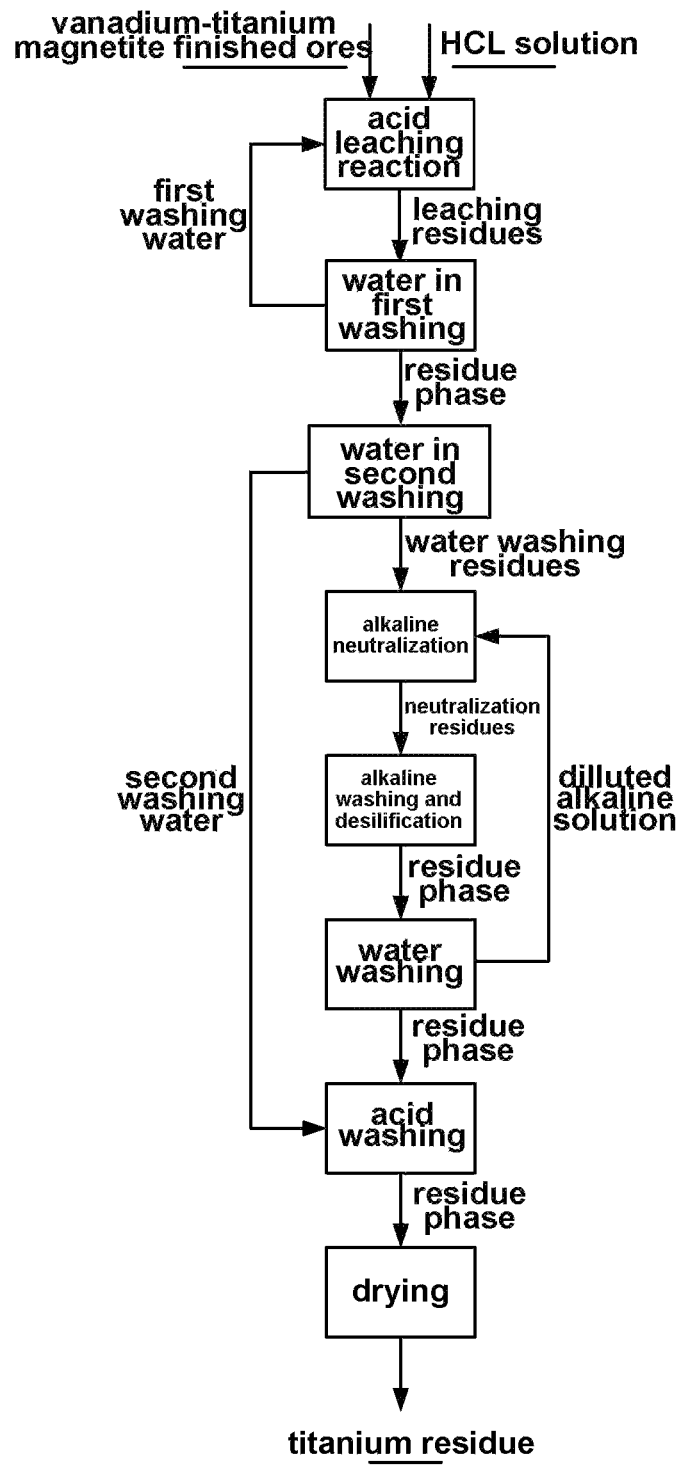
FIG. 2 is a process flow diagram of embodiment 6 of the invention.
Figure 3:
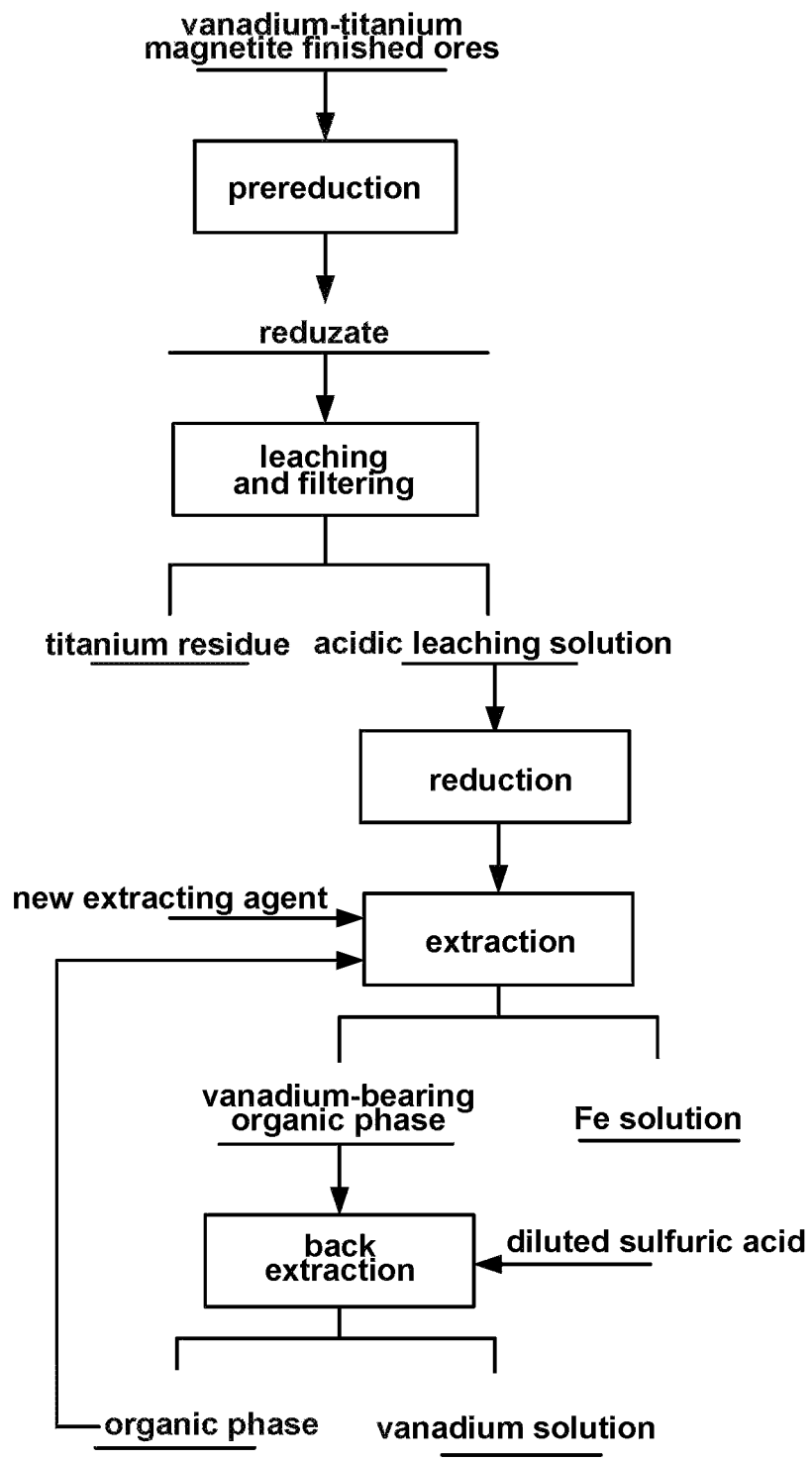
FIG. 3 is a process flow diagram of embodiment 12 of the invention.

The main ingredients of vanadium-titanium magnetite finished ores as a raw material by mass content are as follows: 52.25% of TFe, 14.32% of $TiO_2$ and 1.15% of $V_2O_5$, and 80% of vanadium-titanium magnetite finished ores which are ground into −200 meshes;

(1) pre-reducing the ground vanadium-titanium magnetite finished ores in a fluidized bed for 50 min at 700° C. so as to reduce Fe(III) in the finished ores into Fe(II):

(2) putting reduzate obtained in the step (1) in 36 wt % HCL, carrying out heat-preservation stirring for 2 h at 100° C. under the condition that a liquid-solid ratio is 1:1, and filtering to obtain a vanadium-containing leaching solution and leaching residue;

(3) adding Fe powder to the vanadium-containing leaching solution obtained in the step 2), and reducing for 4 h at 30° C. so as to reduce Fe(III) in the leaching solution into Fe(II):

(4) adjusting pH of the reducing solution obtained in the step (3) with CaCO3 to −0.5, and filtering;

(5) extracting the solution obtained in the step (4) and a kerosene mixed solvent of 20% P204 and 5% TBP for two times according to a volume ratio of 1:1:

(6) carrying out back extraction on a loaded vanadium-bearing organic phase obtained in the step (5) for four times by using 1 mol/L sulfuric acid under the condition that a ratio of the loaded organic phase to an aqueous phase is 1:1 to obtain a pure vanadium-containing solution, wherein the extraction rate of iron is 1.25%, and the extraction rate of vanadium is 98.26%;

(7) carrying out secondary water washing on the leaching residue obtained in the step (2) for 15 min at 80° C. under the condition that a liquid-solid ratio is 4:1; (8) neutralizing water washing residue obtained after filtering with a NaOH alkaline solution having the concentration of 10% for 30 min at 40° C. under the condition that a liquid-solid ratio of the alkaline solution to the water washing residue is 5:1, adjusting the pH value of slurry to 5-6, and then filtering to obtain neutralization residue;

(9) subjecting the neutralization residue and a 15% NaOH solution to a desilicification reaction for 30 min at 80° C. wherein a liquid-solid ratio of the NaOH solution to the neutralization residue is 3:1; and then filtering and carrying out water washing, and then filtering to obtain water washing residue, wherein a liquid-solid ratio of water to alkaline washing residue is 2:1; and

(10) washing the obtained water washing residue with 20% diluted sulfuric acid and adjusting the pH value to 5-6, wherein a liquid-phase ratio of the diluted sulfuric acid to the water washing residue is 2:1; and finally, drying residue obtained by filtering to obtain titanium residue.

Embodiment 2

The main ingredients of vanadium-titanium magnetite finished ores as a raw material by mass content are as follows: 42.13% of TFe, 19.43% of $TiO_2$, 0.98% of $V_2O_5$, and 80% of vanadium-titanium magnetite finished ores which are ground into −200 meshes:

(1) pre-reducing the ground vanadium-titanium magnetite finished ores in a fluidized bed for 20 min at 800° C. so as to reduce Fe(III) in the finished ores into Fe(II);

(2) putting the obtained reduzate obtained in the step (1) in 10 wt % HCL, carrying out heat-preservation stirring for 10 h at 150° C. under the condition that a liquid-solid ratio is 10:1, and filtering to obtain a vanadium-containing leaching solution and leaching residue;

(3) adding Fe powder to the vanadium-containing leaching solution obtained in the step (2), and reducing for 0.5 h at 90° C. so as to reduce Fe(III) in the leaching solution into Fe(II);

(4) adjusting pH of the reducing solution obtained in the step (3) with $Ca(OH)_2$ to 2, and filtering;

(5) extracting the solution obtained in the step (4) and a kerosene mixed solvent of 30% P507 and 5% TBP for five times according to a volume ratio of 6:1; (6) carrying out back extraction on a loaded vanadium-bearing organic phase obtained in the step (5) for two times by using 4.5 mol/L sulfuric acid under the condition that a ratio of the loaded organic phase to an aqueous phase is 1:1 to obtain a pure vanadium-containing solution, wherein the extraction rate of iron is 3.13%, and the extraction rate of vanadium is 97.35%:

(7) carrying out water washing on the leaching residue obtained in the step (2) for 30 min at 60° C. under the condition that a liquid-solid ratio is 3:1;

(8) neutralizing the water washing residue obtained after filtering with a NaOH alkaline solution having the concentration of 5% for 20 min at 60° C. under the condition that a liquid-solid ratio of the alkaline solution to the water washing residue is 10:1, adjusting the pH value of slurry to 5-6, and then filtering to obtain neutralization residue;

(9) subjecting the neutralization residue and a 9% NaOH solution to a desilicification reaction for 5 min at 110° C., wherein a liquid-solid ratio of the NaOH solution to the neutralization residue is 6:1; and then filtering and carrying out water washing, and then filtering to obtain water washing residue, wherein a liquid-solid ratio of water to alkaline washing residue is 10:1; and

(10) washing the obtained water washing residue with 50% diluted sulfuric acid and adjusting the pH value to 5-6, wherein a liquid-solid ratio of the diluted sulfuric acid to the water washing residue is 10:1; and finally, drying residue obtained by filtering to obtain titanium residue.

Embodiment 3

The main ingredients of vanadium-titanium magnetite finished ores as a raw material by mass content are as follows: 40.16% of TFe, 20.15% of $TiO_2$, 1.03% of $V_2O_5$, and 80% of vanadium-titanium magnetite finished ores which are ground into −200 meshes;

(1) pre-reducing the ground vanadium-titanium magnetite finished ores in a fluidized bed for 60 min at 750° C. so as to reduce Fe(III) in the finished ores into Fe(I);

(2) putting the reduzate obtained in the step (1) in 20 wt % HCL, carrying out heat-preservation stirring for 6 hours at 120° C. under the condition that a liquid-solid ratio is 1:5, and filtering to obtain a vanadium-containing leaching solution and leaching residue;

(3) adding sodium sulfite to the vanadium-containing leaching solution obtained in the step (2), and reducing for 3 h at 50° C. so as to reduce Fe(III) in the leaching solution into Fe(II);

(4) adjusting pH of the reducing solution obtained in the step (3) with NaOH to 0.2, and filtering;

(5) extracting the solution obtained in the step (4) and a kerosene mixed solvent of 25% P204 and 10% TBP for four times according to a volume ratio of 5:1;

(6) carrying out back extraction on a loaded vanadium-bearing organic phase obtained in the step (5) for three times by using 8 mol/L HCL under the condition that a ratio of the loaded organic phase to an aqueous phase is 1:4 to obtain a pure vanadium-containing solution, wherein the extraction rate of iron is 2.38%, and the extraction rate of vanadium is 99.05%;

(7) carrying out secondary water washing on the leaching residue obtained in the step (2) for 60 min at 25° C. under the condition that a liquid-solid ratio is 6:1;

(8) neutralizing the water washing residue obtained after filtering with a NaOH alkaline solution having a concentration of 20% for 10 min at 80° C. under the condition that a liquid-solid ratio of the alkaline solution to the water washing residue is 2:1, adjusting the pH value of slurry to 5-6, and then filtering to obtain neutralization residue;

(9) subjecting the neutralization residue and a 13% NaOH solution to a desilicification reaction for 60 min at 80° C., wherein a liquid-solid ratio of the NaOH solution to the neutralization residue is 3:1; and then filtering and carrying out water washing, and then filtering to obtain water washing residue, wherein a liquid-solid ratio of water to alkaline washing residue is 4:1; and

(10) washing the obtained water washing residue with 8% diluted sulfuric acid and adjusting the pH value to 5-6, wherein a liquid-solid ratio of the diluted sulfuric acid to the water washing residue is 4:1; and finally, drying residue obtained by filtering to obtain titanium residue.

Embodiment 4

The main ingredients of vanadium-titanium magnetite finished ores as a raw material by mass content are as follows: 43.09% of TFe, 18.56% of $TiO_2$, 1.18% of $V_2O_5$, and 80% of vanadium-titanium magnetite finished ores which are ground into −200 meshes;

(1) pre-reducing the ground vanadium-titanium magnetite finished ores in a fluidized bed for 80 min at 600° C. so as to reduce Fe(III) in the finished ores into Fe(II);

(2) putting the reduzate obtained in the step (1) in 10 wt % HCL, carrying out heat-preservation stirring for 1 h at 150° C. under the condition that a liquid-solid ratio is 1:10, and filtering to obtain a vanadium-containing leaching solution and leaching residue;

(3) adding Fe powder to the vanadium-containing leaching solution obtained in the step (2), and reducing for 2.5 h at 60° C. so as to reduce Fe(III) in the leaching solution into Fe(II);

(4) adjusting pH of the reducing solution obtained in the step (3) with aqueous ammonia to 1, and filtering;

(5) extracting the solution obtained in the step (4) and a kerosene mixed solvent of 30% P204 and 5% TBP for three times according to a volume ratio of 3:1;

(6) carrying out back extraction on a loaded vanadium-bearing organic phase obtained in the step (5) for three times by using 1 mol/L HCL under the condition that a ratio of the loaded organic phase to an aqueous phase is 1:6 to obtain a pure vanadium-containing solution, wherein the extraction rate of iron is 3.0%, and the extraction rate of vanadium is 98.65%;

(7) carrying out water washing on the leaching residue obtained in the step (2) for 45 min at 40° C. under the condition that a liquid-solid ratio is 9:1;

(8) neutralizing the water washing residue obtained after filtering with a NaOH alkaline solution for 60 min at 30° C. under the condition that a liquid-solid ratio of the alkaline solution to the water washing residue is 3:1, adjusting the pH value of slurry to 5-6, and then filtering to obtain neutralization residue;

(9) subjecting the neutralization residue and a 25% NaOH solution to a desilicification reaction for 20 min at 60° C., wherein a liquid-solid ratio of the NaOH solution to the neutralization residue is 2:1; filtering and then carrying out water washing, and then filtering to obtain water washing residue, wherein a liquid-solid ratio of water to alkaline washing residue is 6:1; and

(10) washing the obtained water washing residue with 12% diluted sulfuric acid and adjusting the pH value to 5-6, wherein a liquid-solid ratio of the diluted sulfuric acid to the water washing residue is 6:1; and finally, drying residue obtained by filtering to obtain titanium residue.

Embodiment 5

The main ingredients of vanadium-titanium magnetite finished ores as a raw material by mass content are as follows: 49.77% of TFe, 19.12% of $TiO_2$, 1.03% of $V_2O_5$, and 80% of vanadium-titanium magnetite finished ores which are ground into −200 meshes:

(1) pre-reducing the ground vanadium-titanium magnetite finished ores in a fluidized bed for 20 min at 100° C. so as to reduce Fe(III) in the finished ores into Fe(II):

(2) putting the reduzate obtained in the step (1) in 20 wt % HCL, carrying out heat-preservation stirring for 10 hour at 100° C. under the condition that a liquid-solid ratio is 5:1, and filtering to obtain a vanadium-containing leaching solution and leaching residue;

(3) adding Fe powder to the vanadium-containing leaching solution obtained in the step (2), and reducing for 3 h at 90° C. so as to reduce Fe(II) in the leaching solution into Fe(II);

(4) adjusting pH of the reducing solution obtained in the step (3) with NaOH to 2, and filtering;

(5) extracting the solution obtained in the step (4) and a kerosene mixed solvent of 25% P507 and 10% TBP for five times according to a volume ratio of 4:1;

(6) carrying out back extraction on a loaded vanadium-bearing organic phase obtained in the step (5) for four times by using 1 mol/L sulfuric acid under the condition that a ratio of the loaded organic phase to an aqueous phase is 1:4 to obtain a pure vanadium-containing solution, wherein the extraction rate of iron is 2.73%, and the extraction rate of vanadium is 99.25%;

(7) carrying out water washing on the leaching residue obtained in the step (2) for 5 min at 80° C. under the condition that a liquid-solid ratio is 10:1;

(8) neutralizing the water washing residue obtained after filtering with a NaOH alkaline solution having a concentration of 9% for 5 min at 80° C. under the condition that a liquid-solid ratio of the alkaline solution to the water washing residue is 5:1, adjusting the pH value of slurry to 5-6, and then filtering to obtain neutralization residue;

(9) subjecting the neutralization residue and a 9% NaOH solution to a desilicification reaction for 40 min at 50° C., wherein a liquid-solid ratio of the NaOH solution to the neutralization residue is 10:1; filtering and then carrying out water washing, and then filtering to obtain water washing residue, wherein a liquid-solid ratio of water to alkaline washing residue is 5:1; and

(10) washing the obtained water washing residue with 10% diluted sulfuric acid, and adjusting the pH value to 5-6, wherein a liquid-solid ratio of the diluted sulfuric acid to the water washing residue is 5:1; and finally, drying residue obtained by filtering to obtain titanium residue.

Embodiment 6

Vanadium-titanium magnetite finished ores are leached with 30% HCL at 150° C. in an airtight container, wherein a liquid-solid ratio of HCL to finished ores is 2:1, and after reaction of 4 h, leaching residue is subjected to secondary water washing for 15 min at 80° C. under the condition that a liquid-solid ratio is 4:1. The water washing residue obtained after filtering is neutralized with a NaOH alkaline solution having a concentration of 10% for 30 min at 40° C. under the condition that a liquid-solid ratio of the alkaline solution to the water washing residue is 5:1, and the pH value of slurry is adjusted to 5-6. After filtering, the neutralization residue and a 15% NaOH solution undergo a desilicification reaction for 30 min at 80° C., wherein a liquid-solid ratio of the NaOH solution to the neutralization residue is 3:1; the slurry obtained after desilicification reaction is filtered and then subjected to water washing, wherein a liquid-solid ratio of water to alkaline washing residue is 2:1; the obtained water washing residue is washed with 20% diluted sulfuric acid and the pH value is adjusted to 5-6, wherein a liquid-solid ratio of diluted sulfuric acid to water washing residue is 2:1; and finally, residue obtained by filtering is dried to obtain titanium residue.

Embodiment 7

Vanadium-titanium magnetite finished ores are leached with 10% HCL at 150° C. in an airtight container, wherein a liquid-solid ratio of HCL to finished ores is 10:1, and after reaction of 10 h is finished, leaching residue is subjected to water washing for 30 min at 60° C. under the condition that a liquid-solid ratio is 3:1. The water washing residue obtained after filtering is neutralized with a NaOH alkaline solution having a concentration of 5% for 20 min at 60° C. under the condition that a liquid-solid ratio of the alkaline solution to the water washing residue is 10:1, and the pH value of slurry is adjusted to 5-6. After filtering, the neutralization residue and a 9% NaOH solution undergo a desilicification reaction for n5 min at 110° C., wherein a liquid-solid ratio of the NaOH solution to the neutralization residue is 6:1; the slurry obtained after the desilicification reaction is filtered and then subjected to water washing, wherein a liquid-solid ratio of water to alkaline washing residue is 10:1; the obtained water washing residue is washed with 5% diluted sulfuric acid and the pH value is adjusted to 5-6, wherein a liquid-solid ratio of diluted sulfuric acid to water washing residue is 10:1; and finally, residue obtained by filtering is dried to obtain titanium residue.

Embodiment 8

Vanadium-titanium magnetite finished ores are leached with 20% HCL at 110° C. at ordinary pressure, wherein a liquid-solid ratio of HCL to finished ores is 5:1, and after reaction of 6 h is finished, leaching residue is subjected to water washing for 60 min at 25° C. under the condition that a liquid-solid ratio is 6:1. The water washing residue obtained after filtering is neutralized with a NaOH alkaline solution having a concentration of 20% for 10 min at 80° C. under the condition that a liquid-solid ratio of the alkaline solution to the water washing residue is 2:1, and the pH value of slurry is adjusted to 5-6. After filtering, the neutralization residue and a 13% NaOH solution undergo a desilicification reaction for 60 min at 80° C., wherein a liquid-solid ratio of the NaOH solution to the neutralization residue is 3:1; the slurry obtained after the desilicification reaction is filtered and then subjected to water washing, wherein a liquid-solid ratio of water to alkaline washing residue is 4:1; the obtained water washing residue is washed with 8% diluted sulfuric acid and the pH value is adjusted to 5-6, wherein a liquid-solid ratio of diluted sulfuric acid to water washing residue is 4:1; and finally, residue obtained by filtering is dried to obtain titanium residue.

Embodiment 9

Vanadium-titanium magnetite finished ores are leached with 36% concentrated HCL at 100° C. at ordinary pressure, wherein a liquid-solid ratio of HCL to finished ores is 1:1, and after reaction of 6 h is finished, leaching residue is subjected to water washing for 45 min at 40° C. under the condition that a liquid-solid ratio is 9:1. The water washing residue obtained after filtering is neutralized with a NaOH alkaline solution having a concentration of 150% for 60 min at 30° C. under the condition that a liquid-solid ratio of the alkaline solution to the water washing residue is 3:1, and the pH value of slurry is adjusted to 5-6. After filtering, the neutralization residue and a 25% NaOH solution undergo a desilicification reaction for 20 min at 60° C., wherein a liquid-solid ratio of the NaOH solution to the neutralization residue is 2:1; the slurry obtained after the desilicification reaction is filtered and then subjected to water washing, wherein a liquid-solid ratio of water to alkaline washing residue is 6:1; the obtained water washing residue is washed with 12% diluted sulfuric acid and the pH value is adjusted to 5-6, wherein a liquid-solid ratio of diluted sulfuric acid to water washing residue is 6:1; and finally, residue obtained by filtering is dried to obtain titanium residue.

Embodiment 10

Vanadium-titanium magnetite finished ores are leached with 36% concentrated HCL at 150° C. at ordinary pressure, wherein a liquid-solid ratio of HCL to finished ores is 8:1, and after reaction of 1 h is finished, leaching residue is subjected to water washing for 5 min at 80° C. under the condition that a liquid-solid ratio is 10:1. The water washing residue obtained after filtering is neutralized with a NaOH alkaline solution having a concentration of 9% for 5 min at 80° C. under the condition that a liquid-solid ratio of the alkaline solution to the water washing residue is 5:1, and the pH value of slurry is adjusted to 5-6. After filtering, the neutralization residue and a 9% NaOH solution undergo a desilicification reaction for 40 min at 500° C., wherein a liquid-solid ratio of the NaOH solution to the neutralization residue is 10:1; the slurry obtained after the desilicification reaction is filtered and then subjected to water washing, wherein a liquid-solid ratio of water to alkaline washing residue is 5:1; the obtained water washing residue is washed with 10% diluted sulfuric acid and the pH value is adjusted to 5-6, wherein a liquid-solid ratio of diluted sulfuric acid to water washing residue is 5:1; and finally, residue obtained by filtering is dried to obtain titanium residue.

Embodiment 11

Vanadium-titanium magnetite finished ores are leached with 10% HCL at 100° C. at ordinary pressure, wherein a liquid-solid ratio of HCL to finished ores is 1:1, and after reaction of 10 h is finished, leaching residue is subjected to water washing for 40 min at 60° C. under the condition that a liquid-solid ratio is 2:1. The water washing residue obtained after filtering is neutralized with a NaOH alkaline solution having a concentration of 20% for 60 min at 25° C. under the condition that a liquid-solid ratio of the alkaline solution to the water washing residue is 2:1, and the pH value of slurry is adjusted to 5-6. After filtering, the neutralization residue and a 20% NaOH solution undergo a desilicification reaction for 20 min at 90° C., wherein a liquid-solid ratio of the NaOH solution to the neutralization residue is 2:1; the slurry is filtered and then subjected to water washing, wherein a liquid-solid ratio of water to alkaline washing residue is 3:1; the obtained water washing residue is washed with 6% diluted sulfuric acid and the pH value is adjusted to 5-6, wherein a liquid-solid ratio of diluted sulfuric acid to water washing residue is 3:1; and finally, residue obtained by filtering is dried to obtain titanium residue.

Embodiment 12

The main ingredients of vanadium-titanium magnetite finished ores as a raw material by mass content are as follows: 52.25% of TFe, 14.32% of $TiO_2$, 1.15% of $V_2O_5$, and 80% of vanadium-titanium magnetite finished ores which are ground into −200 meshes;

(1) pre-reducing the ground vanadium-titanium magnetite finished ores in a fluidized bed for 50 min at 700° C. so as to reduce Fe(III) in the finished ores into Fe(II);

(2) putting the reduzate obtained in the step (1) in 36 wt % HCL, carrying out heat-preservation stirring for 2 hours at 100° C. under the condition that a liquid-solid ratio is 1:1, and filtering to obtain a vanadium-containing leaching solution;

(3) adding Fe powder to the vanadium-containing leaching solution obtained in the step (2), and reducing for 4 h at 30° C. so as to reduce Fe(III) in the leaching solution into Fe(II):

(4) adjusting pH of the reducing solution obtained in the step (3) with CaCO3 to −0.5, and filtering;

(5) extracting the solution obtained in the step (4) and a kerosene mixed solvent of 20% P204 and 5% TBP for two times according to a volume ratio of 1:1; and (6) carrying out back extraction on a loaded vanadium-bearing organic phase obtained in the step (5) for four times by using 1 mol/L sulfuric acid under the condition that a ratio of the loaded organic phase to an aqueous phase is 1:1 to obtain a pure vanadium-containing solution, wherein the extraction rate of iron is 1.25%, and the extraction rate of vanadium is 98.26%.

Embodiment 13

The main ingredients of vanadium-titanium magnetite finished ores as a raw material by mass content are as follows: 42.13% of TFe, 19.43% of $TiO_2$, 0.98% of $V_2O_5$, and 80% of vanadium-titanium magnetite finished ores which are ground into −200 meshes:

(1) pre-reducing the ground vanadium-titanium magnetite finished ores in a fluidized bed for 20 min at 800° C. to reduce Fe(III) in the finished ores into Fe(II);

(2) putting the reduzate obtained in the step (1) in 10 wt % HCL, carrying out heat-preservation stirring for 10 h at 150° C. under the condition that a liquid-solid ratio is 10:1, and filtering to obtain a vanadium-containing leaching solution;

(3) adding Fe powder to the vanadium-containing leaching solution obtained in the step (2), and reducing for 0.5 h at 90° C. so as to reduce Fe(II) in the leaching solution into Fe(II);

(4) adjusting pH of the reducing solution obtained in the step (3) with $Ca(OH)_2$ to 2, and filtering;

(5) extracting the solution obtained in the step (4) and a kerosene mixed solvent of 30% P507 and 5% TBP for five times according to a volume ratio of 6:1; and (6) carrying out back extraction on a loaded vanadium-bearing organic phase obtained in the step (5) for two times by using 4.5 mol/L sulfuric acid under the condition that a ratio of the loaded organic phase to an aqueous phase is 1:1 to obtain a pure vanadium-containing solution, wherein the extraction rate of iron is 3.13%, and the extraction rate of vanadium is 97.35%.

Embodiment 14

The main ingredients of vanadium-titanium magnetite finished ores as a raw material by mass content are as follows: 40.16% of TFe, 20.15% of $TiO_2$ and 1.03% of $V_2O_5$, and 80% of vanadium-titanium magnetite finished ores which are ground into −200 meshes;

(1) pre-reducing the ground vanadium-titanium magnetite finished ores in a fluidized bed for 60 min at 750° C. so as to reduce Fe(III) in the finished ores into Fe(II):

(2) putting the reduzate obtained in the step (1) in 20 wt % HCL, carrying out heat-preservation stirring for 6 h at 120° C. under the condition that a liquid-solid ratio is 1:5, and filtering to obtain a vanadium-containing leaching solution:

(3) adding sodium sulfite to the vanadium-containing leaching solution obtained in the step (2), and reducing for 3 h at 50° C. so as to reduce Fe(III) in the leaching solution into Fe(II);

(4) adjusting pH of the reducing solution obtained in the step (3) with NaOH to 0.2, and filtering;

(5) extracting the solution obtained in the step (4) and a kerosene mixed solvent of 25% P204 and 10% TBP for four times according to a volume ratio of 5:1; and (6) carrying out back extraction on a loaded vanadium-bearing organic phase obtained in the step (5) for three times by using 8 mol/L HCL under the condition that a ratio of the loaded organic phase to an aqueous phase is 1:4 to obtain a pure vanadium-containing solution, wherein the extraction rate of iron is 2.38%, and the extraction rate of vanadium is 99.05%.

Embodiment 15

The main ingredients of vanadium-titanium magnetite finished ores as a raw material by mass content are as follows: 43.09% of TFe, 18.65% of $TiO_2$, 1.18% of $V_2O_5$, and 80% of vanadium-titanium magnetite finished ores which are ground into −200 meshes;

(1) pre-reducing the ground vanadium-titanium magnetite finished ores in a fluidized bed for 80 min at 600° C. so as to reduce Fe(III) in the finished ores into Fe(WI);

(2) putting the reduzate obtained in the step (1) to 10 wt % HCL, carrying out heat-preservation stirring for 1 h at 150° C. under the condition that a liquid-solid ratio is 1:10, and filtering to obtain a vanadium-containing leaching solution:

(3) adding Fe powder to the vanadium-containing leaching solution obtained in the step (2), and reducing for 2.5 h at 60° C. so as to reduce Fe(II) in the leaching solution into Fe(II);

(4) adjusting pH of the reducing solution obtained in the step (3) with aqueous ammonia to 1, and filtering;

(5) extracting the solution obtained in the step (4) and a kerosene mixed solvent of 30% P204 and 5% TBP for three times according to a volume ratio of 3:1; and (6) carrying out back extraction on a loaded vanadium-bearing organic phase obtained in the step (5) for three times by using 1 mol/L HCL under the condition that a ratio of the loaded organic phase to an aqueous phase is 1:6 to obtain a pure vanadium-containing solution, wherein the extraction rate of iron is 3.0%, and the extraction rate of vanadium is 98.65%.

Embodiment 16

The main ingredients of vanadium-titanium magnetite finished ores as a raw material by mass content are as follows: 49.77% of TFe, 19.12% of $TiO_2$, 1.03% of $V_2O_5$, and 80% of vanadium-titanium magnetite finished ores which are ground into −200 meshes:

(1) pre-reducing the ground vanadium-titanium magnetite finished ores in a fluidized bed for 20 min at 100° C. so as to reduce Fe(III) in the finished ores into Fe(II);

(2) putting the reduzate obtained in the step (1) in 20 wt % HCL, carrying out heat-preservation stirring for 10 h at 100° C. under the condition that a liquid-solid ratio is 5:1, and filtering to obtain a vanadium-containing leaching solution;

(3) adding Fe powder to the vanadium-containing leaching solution obtained in the step (2), and reducing for 3 h at 90° C. so as to reduce Fe(II) in the leaching solution into Fe(II);

(4) adjusting pH of the reducing solution obtained in the step (3) with NaOH to 2, and filtering;

(5) extracting the solution obtained in the step (4) and a kerosene mixed solvent of 25% P507 and 10% TBP for five times according to a volume ratio of 4:1; and (6) carrying out back extraction on a loaded vanadium-bearing organic phase obtained in the step (5) for four times by using 1 mol/L sulfuric acid under the condition that a ratio of the loaded organic phase to an aqueous phase is 1:4 to obtain a pure vanadium-containing solution, wherein the extraction rate of iron is 2.73%, and the extraction rate of vanadium is 99.25%.

Of course, the invention can also have multiple embodiments, and those skilled in the art, without departing from the spirit and the essence of the invention, can make various corresponding modifications and variations according to the disclosure of the invention, however, said corresponding modifications and variations should fall into the protection scope of claims of the invention.

The invention claimed is:

1. A method for preparing titanium slag by performing hydrometallurgical treatment on vanadium-titanium magnetite concentrate, comprising the following steps:
    1) mixing the vanadium-titanium magnetite concentrate and a HCl solution, and leaching for 1 to 10 h at 100-150° C. to obtain an intermediate slurry;
    2) filtering the intermediate slurry to obtain leaching residues, and carrying out two-stage water washing on the leaching residues, wherein a water washing time ranges from 5 min to 60 min and a water washing temperature ranges from 25° C. and 80° C. in each stage of water washing;
    3) neutralizing water washing residues obtained in the step 2) with a diluted alkaline solution for 5 to 60 min at 25-80° C., adjusting the pH value of the slurry to 5-6, and filtering the neutralized slurry to obtain neutralization slag;
    4) mixing the neutralization slag with a NaOH solution, and carrying out alkaline washing and desilicification reaction at 50-110° C. for 5 min to 60 min;
    5) filtering a product obtained after the alkaline washing and desilicification reaction in the step 4) to obtain alkaline washing residues and carrying out water washing on the alkaline washing residues; and
    6) washing the water washing residues obtained after water washing in the step 5) with diluted sulfuric acid and adjusting the pH value to 5-6, filtering after acid washing, and drying filter residues to obtain the titanium slag.

2. The method for preparing the titanium slag according to claim 1, wherein a liquid-solid mass ratio of the concentrate to the HCl solution in the step 1) is in a range from 1:1 to 10:1.

3. The method for preparing the titanium slag according to claim 2, wherein the percentage concentration by mass of the HCl solution in the step 1) is in a range from 10% to 36%.

4. The method for preparing the titanium slag according to claim 1, wherein the percentage concentration by mass of the HCl solution in the step 1) is in a range from 10% to 36%.

5. The method for preparing the titanium slag according to claim 1, wherein a liquid-solid ratio of the washing water to the leaching residues in each stage of water washing process in the step 2) is in a range from 2:1 to 10:1.

6. The method for preparing the titanium slag according to claim 4, wherein water washing slurry obtained in the step 2) is filtered to obtain first washing water and second washing water respectively, wherein the first washing water is used for a leaching process in the step 1), and the second washing water is used for an acid washing process in the step 6).

7. The method for preparing the titanium slag according to claim 1, wherein water washing slurry obtained in the step 2) is filtered to obtain first washing water and second washing water respectively, wherein the first washing water is used for a leaching process in the step 1), and the second washing water is used for an acid washing process in the step 6).

8. The method for preparing the titanium slag according to claim 1, wherein a liquid-solid ratio of the diluted alkaline solution to the water washing residues in the step 3) is in a range from 2:1 to 10:1.

9. The method for preparing the titanium slag according to claim 8, wherein a concentration by mass of the diluted alkaline solution in the step 3) is in a range from 5% to 20%.

10. The method for preparing the titanium slag according to claim 8, wherein the diluted alkaline solution in the step 3) is a NaOH solution.

11. The method for preparing the titanium slag according to claim 1, wherein a concentration by mass of the diluted alkaline solution in the step 3) is in a range from 5% to 20%.

12. The method for preparing the titanium slag according to claim 1, wherein the diluted alkaline solution in the step 3) is a NaOH solution.

13. The method for preparing the titanium slag according to claim 1, wherein a liquid-solid ratio of the NaOH solution to the neutralization slag in the step 4) is in a range from 2:1 to 10:1.

14. The method for preparing the titanium slag according to claim 13, wherein a percentage concentration by mass of the NaOH solution in the step 4) is in a range from 9% to 25%.

15. The method for preparing the titanium slag according to claim 1, wherein a percentage concentration by mass of the NaOH solution in the step 4) is in a range from 9% to 25%.

16. The method for preparing the titanium slag according to claim 1, wherein a liquid-solid ratio of the washing water to the alkaline washing residues in the step 5) is in a range from 2:1 to 10:1.

17. The method for preparing the titanium slag according to claim 1, wherein a liquid-solid ratio of the diluted sulfuric acid to the water washing residues is in a range from 2:1 to 10:1.

18. The method for preparing the titanium slag according to claim 17, wherein a concentration of the diluted sulfuric acid in the step 6) is in a range from 5% vol to 20% vol.

19. The method for preparing the titanium slag according to claim 17, wherein washing liquor obtained after water washing and filtering in the step 6) is used for a neutralization process of the water washing residues in the step 3).

20. The method for preparing the titanium slag according to claim 1, wherein a concentration of the diluted sulfuric acid in the step 6) is in a range from 5% vol to 20% vol.

21. The method for preparing the titanium slag according to claim 1, wherein washing liquor obtained after water washing and filtering in the step 6) is used for a neutralization process of the water washing residues in the step 3).

22. A method for extracting vanadium from vanadium-titanium magnetite concentrate, comprising the following steps:
  1) pre-reducing the vanadium-titanium magnetite concentrate at a reaction temperature of 600-1000° C. so as to reduce Fe(III) in the concentrate into Fe(II) to obtain a reduzate;
  2) mixing the reduzate with HCl, and leaching for 1-10 h at 100-150° C. to obtain an intermediate slurry;
  3) filtering the intermediate slurry to obtain a vanadium-containing leaching solution and leaching residues;
  4) heating the vanadium-containing leaching solution to 30-90° C., stirring, and adding a reducing agent to reduce Fe(III) in the leaching solution into Fe(II) to obtain a reducing solution;
  5) adjusting the pH value of the reducing solution obtained to −0.5 to 2, and filtering to obtain a filtered solution;
  6) mixing the filtered solution obtained in the step 5) with an extracting agent, and extracting to obtain a vanadium-bearing organic phase and raffinate;
  7) carrying out back extraction on the vanadium-bearing organic phase by using an acidic solution to obtain a vanadium-containing solution; and
  8) preparing ammonium vanadate or vanadium pentoxide from the vanadium-containing solution.

23. The method for extracting vanadium from vanadium-titanium magnetite concentrate according to claim 22, wherein a reducing agent used in pre-reduction in the step 1) is gas or hydrogen.

24. The method for extracting vanadium from vanadium-titanium magnetite concentrate according to claim 22, wherein a mass ratio of the reduzate to the HCl in the step 2) is in a range from 1:1 to 1:10.

25. The method for extracting vanadium from vanadium-titanium magnetite concentration according to claim 24, wherein a percentage concentration by mass of the HCl in the step 2) is in a range from 10% to 36%.

26. The method for extracting vanadium from vanadium-titanium magnetite concentration according to claim 22, wherein a percentage concentration by mass of the HCl in the step 2) is in a range from 10% to 36%.

27. The method for extracting vanadium from vanadium-titanium magnetite concentrate according to claim 22, wherein a reducing agent of the step 4) is Fe powder or sodium sulfite.

28. The method for extracting vanadium from vanadium-titanium magnetite concentrate according to claim 22, wherein an alkaline substance in the step 5) is one of NaOH, aqueous ammonia, $CaCO_3$ or $Ca(OH)_2$.

29. The method for extracting vanadium from vanadium-titanium magnetite concentrate according to claim 22, wherein a proportion of the organic phase to an aqueous phase in the extraction process in the step 6) is in a range from 1:1 to 1:6.

30. The method for extracting vanadium from vanadium-titanium magnetite concentrate according to claim 29, wherein the extracting agent in the step 6) is a P204 and TBP kerosene mixed solvent, or a P507 and TBP kerosene mixed solvent.

31. The method for extracting vanadium from vanadium-titanium magnetite concentrate according to claim 22, wherein the extracting agent in the step 6) is a P204 and TBP kerosene mixed solvent, or a P507 and TBP kerosene mixed solvent.

32. A method for extracting vanadium from vanadium-titanium magnetite concentrate according to claim 22, wherein a proportion of the vanadium-bearing organic phase to an aqueous phase in the back extraction process in the step 7) is in a range from 1:1 to 6:1.

33. The method for extracting vanadium from vanadium-titanium magnetite concentrate according to claim 32, wherein the acidic solution in the step 7) is 1-4.5 mol/L diluted sulfuric acid or 1-8 mol/L diluted HCl.

34. The method for extracting vanadium from vanadium-titanium magnetite concentrate according to claim 22, wherein the acidic solution in the step 7) is 1-4.5 mol/L diluted sulfuric acid or 1-8 mol/L diluted HCl.

35. The method for extracting vanadium from vanadium-titanium magnetite concentrate according to claim 22, wherein a preparation method of the step 8) is a precipitation method.

36. The method for extracting vanadium from vanadium-titanium magnetite concentrate according to claim 22, wherein the leaching residues obtained by filtering in the step 3) are subjected to hydrometallurgical treatment which comprises the following steps:

3-1) carrying out two-stage water washing on leaching residues, wherein the water washing time ranges from 5 min to 60 min and the water washing temperature ranges from 25° C. to 80° C. in each stage of water washing;

3-2) neutralizing water washing residues obtained in the step 3-1) with a diluted alkaline solution for 5-60min at 25-80° C., adjusting the pH value of slurry to 5-6, and filtering the neutralized slurry to obtain a neutralization slag;

3-3) mixing the neutralization slag obtained in the step 3-2) with a NaOH solution, and carrying out alkaline washing and desilicification reaction at 50-110° C. for 5-60 min;

3-4) filtering the product obtained after alkaline washing and desilicification reaction in the step 3-3) to obtain alkaline washing residues and carrying out water washing; and 3-5) washing the water washing residues obtained after water washing in the step 3-4) with diluted sulfuric acid and adjusting the pH value to 5-6, filtering after acid washing, and drying filter residues to obtain titanium slag.

37. The method for extracting vanadium from vanadium-titanium magnetite concentrate according to claim 36, wherein a liquid-solid ratio of the diluted alkaline solution to the water washing residues in the step 3-2) is in a range from 2:1 to 10:1.

38. The method for extracting vanadium from vanadium-titanium magnetite concentrate according to claim 37, wherein a concentration by mass of the diluted alkaline solution in the step 3-2) is in a range from 5% to 20%.

39. The method for extracting vanadium from vanadium-titanium magnetite concentrate according to claim 37, wherein the diluted alkaline solution in the step 3-2) is a NaOH solution.

40. The method for extracting vanadium from vanadium-titanium magnetite concentrate according to claim 36, wherein a concentration by mass of the diluted alkaline solution in the step 3-2) is in a range from 5% to 20%.

41. The method for extracting vanadium from vanadium-titanium magnetite concentrate according to claim 36, wherein the diluted alkaline solution in the step 3-2) is a NaOH solution.

42. The method for extracting vanadium from vanadium-titanium magnetite concentrate according to claim 36, wherein a liquid-solid ratio of the NaOH solution to the neutralization slag in the step 3-3) is in a range from 2:1 to 10:1.

43. The method for extracting vanadium from vanadium-titanium magnetite concentrate according to claim 42, wherein a percentage concentration by mass of the NaOH solution in the step 3-3) is in a range from 9% to 25%.

44. The method for extracting vanadium from vanadium-titanium magnetite concentrate according to claim 36, wherein a percentage concentration by mass of the NaOH solution in the step 3-3) is in a range from 9% to 25%.

45. The method for extracting vanadium from vanadium-titanium magnetite concentrate according to claim 36, wherein a liquid-solid ratio of the washing water to the alkaline washing residues in the step 3-4) is in a range from 2:1 to 10:1.

46. The method for extracting vanadium from vanadium-titanium magnetite concentrate according to claim 36, wherein a liquid-solid ratio of the diluted sulfuric acid to water washing residues in the step 3-5) is in a range from 2:1 to 10:1.

47. The method for extracting vanadium from vanadium-titanium magnetite concentrate according to claim 46, wherein the concentration of the diluted sulfuric acid in the step 3-5) is in a range from 5% vol to 20% vol.

48. The method for extracting vanadium from vanadium-titanium magnetite concentrate according to claim 36, wherein the concentration of the diluted sulfuric acid in the step 3-5) is in a range from 5% vol to 20% vol.

49. The method for extracting vanadium from vanadium-titanium magnetite concentrate according to claim 48, wherein the washing liquor obtained after water washing and filtering in the step 3-5) is used for a neutralization process of the water washing residues in the step 3-2).

50. The method for extracting vanadium from vanadium-titanium magnetite concentrate according to claim 49, wherein the washing liquor obtained after water washing and filtering in the step 3-5) is used for a neutralization process of the water washing residues in the step 3-2).

51. The method for extracting vanadium from vanadium-titanium magnetite concentrate according to claim 36, wherein the washing liquor obtained after water washing and filtering in the step 3-5) is used for a neutralization process of the water washing residues in the step 3-2).

52. The method for extracting vanadium from vanadium-titanium magnetite concentrate according to claim 36, wherein the raffinate in the step 6) is calcined to prepare ferric oxide.

53. The method for extracting vanadium from vanadium-titanium magnetite concentrate according to claim 36, wherein a liquid-solid ratio of washing water to leaching residues in each stage of water washing process in the step 3-1) is in a range from 2:1 to 10:1.

54. The method for extracting vanadium from vanadium-titanium magnetite concentrate according to claim 53, wherein the water washing slurry in the step 3-1) is filtered to obtain a first washing water and a second washing water respectively, wherein the first washing water is used for a leaching process in the step 2), and the second washing water is used for an acid washing process in the step 3-5).

55. The method for extracting vanadium from vanadium-titanium magnetite concentrate according to claim 22, wherein the raffinate in the step 6) is calcined to prepare ferric oxide.

* * * * *